United States Patent Office 3,825,593
Patented July 23, 1974

---

3,825,593
CARBOXYLATION OF PHENOLS
William H. Meek, Northfield, Ohio, assignor to Ferro Corporation, Cleveland, Ohio
No Drawing. Continuation-in-part of application Ser. No. 712,933, Mar. 14, 1968, which is a continuation-in-part of application Ser. No. 629,094, Apr. 7, 1967, both now abandoned. This application Aug. 29, 1969, Ser. No. 854,269
Int. Cl. C07c 65/04
U.S. Cl. 260—521 C     5 Claims

ABSTRACT OF THE DISCLOSURE

Substituted aromatic phenates of the formula:

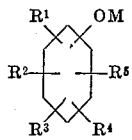

wherein the groups represented by R's are selected from hydrogen, halogen, alkyl, alkylthio, alkoxy, dialkylamino, benzyl and alpha-methylbenzyl and wherein two of said R's can be taken together to form a naphthyl or quinoline ring, providing that not more than four R's are hydrogen; and M is a metal, preferably an alkali metal, are carboxylated by reaction with carbon dioxide in good yield in the presence of an aliphatic N,N-dimethylamide having from 3 to 10 carbon atoms and preferably in the presence of an excess of metal alkoxide based on the carbon dioxide. Preferably amides are dimethylformamide and dimethylacetamide.

---

This application is a continuation-in-part of Ser. No. 712,933, filed Mar. 14, 1968, now abandoned, which is a continuation-in-part of Ser. No. 629,094, filed Apr. 7, 1967, now abandoned.

This invention relates to the carboxylation of aromatic compounds and more particularly to the carboxylation of aromatic phenates of the formula:

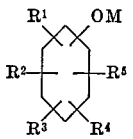

wherein the groups represented by R's are selected from hydrogen, halogen, alkyl, alkylthio, alkoxy, dialkylamino, benzyl and alpha-methylbenzyl and wherein two of said R's can be taken together to complete a naphthyl or quinoline ring, providing that not more than four R's are hydrogen; and M is a metal.

The invention also relates to novel compounds which can be represented by the formula:

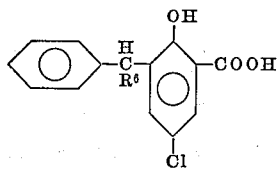

wherein $R^6$ is methyl or hydrogen. The novel compounds of the invention are useful as bacteriostats and fungistats.

More particularly the process of the invention comprises reacting the aforesaid aromatic phenate with carbon dioxide in the presence of an aliphatic N,N-dimethylamide having from 3 to 10 carbon atoms. In a preferred embodiment, the reaction is conducted in the presence of an excess of metal alkoxide, based on the carbon dioxide.

While it is known that unsubstituted phenols can be carboxylated in an aprotic solvent such as dimethylformamide, yields obtained in accordance with the teaching of the prior art were generally lower than those obtained for the conventional high pressure Kolbe-Schmitt process. Hirao taught the carboxylation of sodium phenate (sodium phenoxide) at atmospheric pressure in dimethylformamide, dimethyl sulfoxide and nitrobenzene. The product is, ultimately, sodium salicylate, which on acidification yields salicylic acid.

Hirao's method produces yields of salicylic acid lower than those obtained in the conventional Kolbe-Schmitt process. Thus Hirao, Hana and Kitamura (Yuki Gosei Kagaku Kyokaishi, 25 66 (1967)) reporting on the effects of reaction time and temperature achieved only a maximum yield of carboxylic acids of 35%, while 75% yield is readily attainable by the Kolbe-Schmitt process, (Lindsey and Jesky Chem. Rev. 57 589 (1957)). When an attempt was made to raise the yields by increasing the temperature above 150° C., the yields were not increased. (Hirao, Ota, Sueta, Hara, Yuki Gosei Kagaku Kyokaishi 25 412–16 (1967); (Their Fig. 1).

Moreover, Hirao found that para-carboxylation was favored. Thus when potassium phenate was carboxylated at atmospheric pressure, 83% of the product was para-hydroxy benzoic acid. Only 16% of the 22% total carboxylic acids was salicylic acid, and 1% 4-hydroxyisophthalic acid. Yuki Gosei Kagaku Kyokaishi, 24, 1051–4 (1966).

The importance of good yields increases when one carboxylates, substituted phenols, which are more expensive than unsubstituted phenols. Hence prior publications indicate that Kolbe-Schmitt carboxylation is the route of choice to carboxylation of substituted phenols.

It has now been quite unexpectedly discovered that when metal phenates of substituted phenols are carboxylated in the presence of a N,N-dimethylamide having from 3 to 10 carbon atoms, metal hydroxybenzoates can be produced in yields substantially above that found by Hirao for unsubstituted phenols; such yields may be even as high as 90%. Moreover it has been found that when certain metal phenates are carboxylated so that there is present at all times a significant concentration of uncarbonated alkoxide, yields can be further increased. In addition the yields are generally greater than those obtained by the Kolbe-Schmitt high pressure reaction for the same phenols. Moreover, metal salicylates can be prepared in good yield instead of the para-hydroxybenzoates taught by the prior art.

The metal phenates which can be carboxylated in good yield can be represented by the formula:

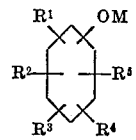

wherein the groups represented by R's are selected from hydrogen, halogen, alkyl, alkylthio, alkoxy, dialkylamino, benzyl and alpha-methylbenzyl and wherein two of said R's can be taken together to complete a naphthyl or quinoline ring providing that not more than four R's are hydrogen; and M is a metal, to prepare compounds of the formula:

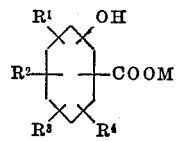

wherein the R groups and M are as previously defined except that not more than three R's can be hydrogen. The corresponding free acid may be produced by acidification.

The alkyl, alkylthio and alkoxy groups can have from 1 to 15 carbon atoms, and the dialkylamino from 2 to 10 carbon atoms. The halogens can be chlorine or fluorine. Exemplary of suitable alkyl are methyl, ethyl, isopropyl, butyl, pentyl, hexyl, heptyl, octyl, nonyl, dodecyl and *meta*-pentadecyl. Exemplary of suitable alkoxy are methoxy, ethoxy, propoxy, butoxy, pentoxy, heptoxy, octaoxy, and *meta*-pentadecoxy. Exemplary of suitable dialkylamino are dimethylamino, diethylamino, dipropylamino and dipentylamino.

The metal can be an alkali metal such as sodium, potassium and lithium, or other metals such as magnesium can also be employed. Metal alkoxides which can be employed are those formed from treating one of the aforesaid metals with an aliphatic alcohol. The alcohols having from 1 to 5 carbon atoms are preferred by reason of their ready availability.

The preferred alcohols are methanol, ethanol and isopropanol for the reason that they readily react with the aforesaid metals to form alkoxides and generally the phenates are carboxylated in better yields with these solvents.

Suitable N,N-dimethylamides include dimethylformamide, dimethylacetamide and dimethylpropionamide. Dimethylformamide is preferred by reason of its ready availability and efficacy.

The reaction can be conveniently carried out at a temperature between about 120 and 200° C. or the boiling point of the dimethylamide solvent. The reaction will generally be complete in from about 1 to about 3 hours depending on the temperature and particular solvent employed. Recovery of the resultant metal salts can be accomplished by conventional means such as distillation, crystallization or the like or the salt can be acidified to form the free acid and the acid recovered by conventional means such as filtration.

The metal phenate starting materials can be prepared by reacting the particular substituted phenol with one of the aforesaid metals, their hydroxides or alkoxides. When the phenol is treated with a metal hydroxide, the water of reaction must be removed before the phenate is treated with carbon dioxide. Accordingly it is preferred to form the phenate from either the metal or its alkoxide so that no water of reaction is formed, and all of the reactants including the carbon dioxide can be added at one time.

In a preferred embodiment when the carboxylation is conducted in the presence of a metal alkoxide, the same metal alkoxide can be employed which is used to form the phenate, but sufficient metal alkoxide must be present after the phenate is formed to provide a slight excess based on the carbon dioxide reactant, for example, in the range of 1.3 to 1.0 moles of metal alkoxide per mole of carbon dioxide. For maximum yields the molar amount of metal alkoxide to carbon dioxide is about 1.15 to 1.0. When an excess of metal alkoxide is employed, the metal cation may displace the hydrogen from the hydroxyl group but upon acidification or even treatment with water, the metal cation will be displaced.

The following examples will serve to illustrate the invention and its preferred embodiments.

EXAMPLE 1

A 500 ml. three neck reaction flask, equipped with stirrer, thermometer, condenser with drying tube, and cooling bath, was charged with 200 ml. of anhydrous denatured ethanol. 6.9 grams of sodium (0.3 gram atom) cut into small pieces, was dissolved in the alcohol during one hour, with intermittent cooling to maintain the temperature at 25–35° C. A clear, straw colored solution of sodium ethoxide in ethanol resulted.

To this solution was added 50 ml. of dimethylacetamide and 20.6 grams of 2,6-di-butylphenol (0.1 mole). The reaction mass was vigorously agitated and agitation was maintained while 10.0 grams of solid carbon dioxide (0.227 mole) was added forming a clear, dark green gel.

The ethanol and some dimethylacetamide were distilled off until the pot temperature reached 185° C., and this temperature was maintained for 1.5 hours. The reaction mixture was cooled and diluted with 200 ml. of water, the aqueous solution was extracted with 50 ml. toluene, and then acidified with 35 ml. of concentrated hydrochloric acid. The precipitated product was filtered, washed with fresh water and dried to constant weight in a vacuum oven at 60° C. By this method was obtained 23.0 grams of 3,5-di-tertiarybutyl-4-hydroxybenzoic acid (92.0% of theory), melting at 210–13° C.

EXAMPLE 2

A 500 ml. three neck reaction flask equipped with a stirrer, thermometer, condenser with drying tube, and heating mantle, was charged with 100 ml. of dimethylacetamide, 50 ml. of anhydrous isopropanol, 20.6 grams of 2,6-ditertiarybutylphenol (0.1 mole) and 14.0 grams of sodium methoxide (0.26 mole). The sodium methoxide dissolved exothermically forming a clear, light green solution. After treating the solution with an excess of solid carbon dioxide, an additional 2.2 grams of sodium methoxide (0.04 mole) was added.

The alcohol and solvent were distilled from the mixture until the pot temperature reached 185° C. Heating at 185° C. was then continued for 1.5 hours, after which the reaction mixture was cooled and diluted with 200 ml. of water. The aqueous solution was extracted with 50 ml. of toluene and acidified with 35 ml. of concentrated hydrochloric acid. The precipitate was filtered, washed with fresh water and dried to give 23.0 grams of 3,5-ditertiarybutyl-4-hydroxybenzoic acid (92.0% of theory), melting at 210–13° C.

EXAMPLE 3

Preparation of 5-methylsalicylic acid

To a 500 ml. reaction flask equipped with a stirrer, thermometer, Dean-Stark trap and a condenser stopped with a calcium sulfate drying tube was charged 21.6 g. of *p*-cresol (0.20 mole), 12.5 g. of 90% KOH (0.2 mole) and 100 ml. of toluene. The mixture was heated at reflux collecting the water of reaction in the Dean-Stark trap. When all of the water had been removed, 100 ml. of dimethylacetamide was added and the toluene was distilled. As the temperature of the reaction mixture reached 160° C. a gas inlet tube was affixed and a stream of dry $CO_2$ was passed into the mixture at atmospheric pressure. The distillation of solvents was continued until the temperature reached 180° C. While maintaining the $CO_2$ flow the mixture was stirred at 180° C. for two hours and then cooled at 90° C. The flow of $CO_2$ was discontinued and 200 ml. of water was added. The aqueous solution was extracted twice with 50 ml. portions of toluene and then acidified to pH 1 with conc. HCl. The solid product was collected on a Büchner funnel washed with water until free of chloride ion and dried to constant weight in vacuo at 60° C.

The yield of product, melting at 149–51° C., was 25.0 g. (82% of theory) A.V. (calc.) 369; (found) 365.

EXAMPLE 4

Preparation of 3,5-di*tert*.-butyl-4-hydroxybenzoic acid

In accordance with the general procedure of Example 3, 41.2 grams of 2,6-di*tert*.-butylphenol, 12.5 grams of 90% potassium hydroxide, 100 ml. of toluene and 100 ml. of dimethylformamide were employed. The procedure differed in that dimethylformamide was substituted for dimethylacetamide, carbon dioxide was introduced at 140° C. instead of 160° C. and the maximum reaction temperature was 160° C. instead of 180° C. The desired product having a melting point of 215–77° C. and an acid value of 224 was recovered in a 68% yield (34.0 grams).

The reported yield by the Kolbe-Schmitt reaction is 22% (J. Am. Chem. Soc. 79 5019 (1957)).

EXAMPLE 5

Preparation of 3-benzyl-5-chlorosalicylic acid

In accordance with the general procedure of Example 3, 21.8 grams of 2-benzyl-4-chlorophenol was treated with .3 grams of 90% potassium hydroxide, 50 ml. of toluene and 50 ml. of dimethylacetamide to recover the desired product having a m.p. of 184–186° C.

EXAMPLES 6–23

In accordance with the procedure of Examples 3 and 4 the following compounds were prepared by the method indicated.

| Acid product | Method of Example | M.P., °C. | A.V. Calc. | A.V. Found | Percent yield |
|---|---|---|---|---|---|
| 3,5-di-t-butyl salicylic | 4 | 165 | 224 | 224 | 70.0 |
| 5-methyl-3-t-butyl-4-hydroxy benzoic | 3 | 184.5–6.0 | 270 | 270 | 55.5 |
| 3-t-butyl-5-methyl-salicylic | 3 | 198–200 | 270 | 270 | 80.0 |
| 3-t-butyl-6-methyl-salicylic | 3 | 185–6.5 | 270 | 270 | 50.5 |
| 3,5-dimethyl-4-hydroxy-benzoic | 4 | 223–4 | 338 | 338 | 43.0 |
| 5-t-octylsalicylic | 3 | 161–2 | 224 | 222 | 70.0 |
| 5-methoxysalicylic | 4 | 144–6 | 334 | 334 | 77.4 |
| 4-(diethylamino) salicylic | 3 | [1]132 | 268 | 266 | 94.0 |
| 4-(dimethylamino) salicylic | 3 | [1]140 | 310 | 309 | 94.0 |
| 8-hydroxyquinoline-7-carboxylic | 3 | [1]268 | 296 | 293 | 56.8 |
| 8-hydroxyquinaldine-7-carboxylic | 3 | 215 | 276 | 275 | 20.9 |
| 4-methyl-5-(methylthio)salicylic | 3 | 159–62 | 283 | 280 | 58.3 |
| 5-(methylthio)salicylic | 3 | 126–9 | 304.5 | 302 | 60.5 |
| 3-benzyl-5-methyl-salicylic | 3 | 172–4 | 231 | 232 | 32.9 |
| 3-α-methylbenzyl-5-methylsalicylic | 3 | 161–2 | 219 | 219 | 78.0 |
| 3-t-butyl-5-chloro-salicylic | 3 | 218–19 | 245 | 245 | 68.0 |
| 5-fluorosalicylic | 3 | 178–9 | 360 | 358 | 50.5 |
| 3-methylbenzyl-5-chlorosalicylic | 3 | 138–41 | 203 | 200 | 43.5 |
| 5-t-butylsalicylic | 3 | 149–52 | 289 | 289 | 84.0 |

[1] Decomposition

The efficacy of the process of the invention for many substituted compounds can be appreciated from Table I below wherein yields for four compounds prepared by the process of the invention are compared with yields reported in the literature for the same compounds prepared by the Kolbe-Schmitt reaction.

TABLE I

| | Percent yield | | |
|---|---|---|---|
| | This invention | K-S | |
| 3-tert.-butyl-6-methylsalicylic | 50.5 | 19 | W.O. Foye et al., J. Pharm. Sci. (56:332–6 (1967)). |
| 3,5-dimethyl-4-hydroxy-benzoic acid | 43.0 | 37 | Lindsey and Jeskey, Chem. Rev. 57:589 (1957). |
| 5-tert.-butylsalicylic | 84.0 | 74 | Do. |
| 3,5-ditert.-butyl-4-hydroxybenzoic acid | 68.0 | 22 | JACS, 79, 5019 (1957). |

The efficacy of the process of the invention wherein the carboxylation is conducted in the presence of an excess of metal alkoxide is illustrated by the following Table II (columns 1 and 2) wherein an excess of metal alkoxide was employed. The alkoxide employed to obtain the yields reported in column 1 was prepared from metallic sodium and anhydrous alcohol. The alkoxide employed to obtain the yields reported in column 2 was a commercial metal alkoxide which contained a slight amount of water. The yields for compounds prepared by employing a stoichiometric quantity of KOH in a reaction medium of DMF or DMAC are reported in column 3.

TABLE II

| | Percent yield | | |
|---|---|---|---|
| Acid product | Anhydrous NaOCH₃ | Commercial NaOCH₃ | KOH DMF or DMAC |
| 3,5-di-tert.-butyl-4-hydroxybenzoic | 92.8 | 63.0 | 68.0 (DMF) |
| 3-methyl-5-tert.-butyl-4-hydroxybenzoic | 96.0 | 60.0 | 55.5 (DMF) |
| 3,5-di-tert.-butyl-salicylic | 86.0 | 46.0 | 70.0 (DMAC) |
| 3-tert.-butyl-6-methyl-salicylic | 67.0 | 28.0 | 50.5 (DMF) |

From the data reported it can be seen that the reaction system should be free of water and that yields are increased by employing a slight excess of metal alkoxide.

The known compounds prepared by the process of the invention have many uses. For example 5-octyl-salicylic acid and its metal salts are used as additives for lubricants (U.S. 2,467,713) an as stabilizers for PVC (U.S. 3,481,307). The alkylaminosalicylic acids such as 4-diethylamino salicylic acid have tuberculostatic properties (J. Am. Chem. Soc. 73:903 (1951)). The dialkyl hydroxybenzoic acids such as 3,5-di-tert.-butyl-4-hydroxybenzoic acid are useful as intermediates in preparing light stabilizers for polyolefins (U.S. Pats. 3,112,338 and 3,206,431). The naphthoic acids such as 1-hydroxy-2-naphthoic acid are intermediates for the production of a number of azo dyes and the esters of 2-hydroxy-1-naphthoic acid are useful as stabilizers for vinyl chloride-vinylidene chloride copolymers. (Chem. Abst. 54: 1932.) The alkoxy salicylic acids such as 5-methoxysalicylic acid are useful in the preparation of hydrazides which are antioxidants for fats and oils. (Chem. Abst. 52:761.) The hydroxyquinoline compounds such as 8-hydroxyquinoline-7-carboxylic acid are useful as intermediates for dyes. (U.S. Pat. 2,411,646; Chem. Abst. 41:1455.) 5-methylsalicylic acid is also useful as a fungicide. (Andrews, Biochem. J. 75:298–303 (1960).)

The novel compounds of the invention are tested for their effect on bacteria by incorporating in nutrient agar to various dilutions. Stock dilutions of 1% are prepared in isopropyl alcohol. The bacterial cultures are streaked over the surface of the agar. The bacterial plates are incubated at 37° C. for 48 hours and then observed for the presence of growth or no growth. The compound 3-benzyl-5-chlorosalicylic acid was effective in inhibiting growth of *Staphlococcus aureus* at 20 p.p.m., of *Escherichia coli* at 200 p.p.m., and of *Pseudomonas aeruginosa* at 1,000 p.p.m. Against a mixed fungi culture composed of *Aspergillius niger*, *Penicillium citrinium* and *Streptomyces rubrireticuli*, which is streaked over the surface of a sabouraud agar medium, and the resultant fungus plates incubated at 27° C. for 7 to 14 days, the aforesaid compound inhibited growth at 100 p.p.m. The compound 3-alpha-methylbenzyl-5-chlorosalicylic acid is also effective against the aforesaid species.

What is claimed is:

1. A process for carboxylating in an ortho or para position and at atmospheric pressure substituted phenol having the formula:

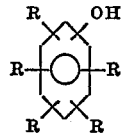

in which the groups represented by R's are selected from hydrogen, methyl, or t-butyl, providing that at least one R is hydrogen and not more than four R's are hydrogen to prepare compounds of the formula:

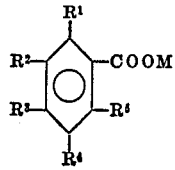

in which $R^1$ is hydrogen or hydroxyl, $R^2$ is hydrogen, methyl or t-butyl, $R^3$ is hydrogen, t-butyl or hydroxyl, $R^4$ is hydrogen, methyl or t-butyl, and $R^5$ is hydrogen or methyl, provided that no more than one R is hydroxyl, and there is at least one alkyl and not more than two alkyl groups present selected from the group consisting of methyl and t-butyl, and M is a metal selected from the group consisting of sodium, potassium, lithium and magnesium comprising reacting said substituted phenol at atmospheric pressure with carbon dioxide in the presence of an aliphatic N,N-dimethylamide having from 3 to 5 carbon atoms, and in the presence of a molar quantity of an anhydrous metal alkoxide that is greater than that of the carbon dioxide, the metal in said metal alkoxide being selected from the class consisting of sodium, potassium, lithium, and magnesium.

2. The process of claim 1 where the molar ratio of metal alkoxide to carbon dioxide is from about 1.3 to 1.0.

3. The process of claim 1 wherein the N,N-dimethylamide is dimethylformamide.

4. The process of claim 1 wherein the N,N-dimethylamide is dimethylacetamide.

5. The process of claim 1 including acidifying said reaction product to produce compounds of the formula:

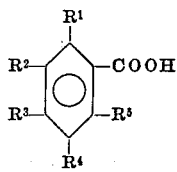

in which the $R^1$ through $R^5$ groups are as previously defined.

References Cited

UNITED STATES PATENTS
3,213,155  10/1965  Schriesheim _____ 260—683.2

FOREIGN PATENTS
734,598  8/1955  Great Britain _____ 260—521 R

OTHER REFERENCES
Chemical Abstracts vol. 67, p. 81900b (Hirao et al.), Chemical Abstracts vol. 69, p. 51797x (Hirao et al.), Chemical Abstracts vol. 66, p. 37582e (Hirao et al.), Hirao et al., Yuki Gosei Kagaku Kyokaishi 25 (5), 417–420 (1957).

Yoki Gosei Kagaku Kyokaishi 1968 26(5) 439–43, publ. May 5, 1968.

Lindsey et al., *Chemical Reviews* 57, No. 4, 583–585, 601 (1957).

Roberts et al., "Basic Principles of Organic Chemistry," W. A. Benjamin, Inc. (1965), pp. 910–911.

Hirao, Yuki Gosei Kagaku Kyokaishi 24 1051–4 (Nov. 1, 1966).

Lindsey et al., Chem. Rev., 57, No. 4, pp. 604–609 (1957).

LORRAINE A. WEINBERGER, Primary Examiner

J. F. TERAPANE, Assistant Examiner

U.S. Cl. X.R.

260—287 R, 516, 519, 520; 424—317